US006555079B2

(12) United States Patent
Hoke et al.

(10) Patent No.: US 6,555,079 B2
(45) Date of Patent: *Apr. 29, 2003

(54) METHOD AND DEVICE FOR CLEANING THE ATMOSPHERE (75) Inventors: Jeffrey B. Hoke, North Brunswick, NJ (US); Ronald M. Heck, Frenchtown, NJ (US); Fred M. Allen, Princeton Junction, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/921,189

(22) Filed: Aug. 2, 2001

(65) Prior Publication Data

US 2001/0055554 A1 Dec. 27, 2001

Related U.S. Application Data (62) Division of application No. 09/689,217, filed on Oct. 12, 2000, which is a division of application No. 09/456,016, filed on Nov. 30, 1999, now Pat. No. 6,190,627.

(51) Int. Cl.$^7$ .............................................. B01D 53/00
(52) U.S. Cl. ..................... 423/210; 423/219; 423/239.1; 423/239.2; 423/244.01; 423/244.02; 423/244.03; 423/244.04; 423/244.07; 423/245.1; 423/247
(58) Field of Search ................................ 423/210, 219, 423/239.1, 239.2, 244.01, 244.02, 244.03, 244.04, 244.07, 245.1, 247

(56) References Cited

U.S. PATENT DOCUMENTS

| 3,738,088 | A |  | 6/1973 | Colosimo ..................... 55/104 |
| 5,080,882 | A |  | 1/1992 | Yoshimoto et al. .......... 423/579 |
| 5,147,429 | A |  | 9/1992 | Bartholomew et al. ....... 55/104 |
| 5,225,390 | A |  | 7/1993 | Vogel .......................... 502/309 |
| 5,620,672 | A |  | 4/1997 | Galligan et al. ............. 423/219 |
| 5,676,913 | A | * | 10/1997 | Cirillo et al. ................ 423/219 |
| 5,997,829 | A | * | 12/1999 | Sekine et al. ............... 423/210 |
| 5,997,831 | A |  | 12/1999 | Dettling et al. ............. 423/219 |
| 6,096,277 | A | * | 8/2000 | Campbell et al. ........... 423/219 |
| 6,190,627 | B1 |  | 2/2001 | Hoke et al. .................. 423/219 |
| 6,200,542 | B1 | * | 3/2001 | Poles et al. .................. 423/210 |
| 6,214,303 | B1 |  | 4/2001 | Hoke et al. .................. 423/210 |
| 2002/0071800 | A1 | * | 6/2002 | Hoke et al. .................. 423/210 |

FOREIGN PATENT DOCUMENTS

| DE | 40 07 965 |  | 9/1991 | ............ B01J/23/84 |
| EP | 0 141 596 A |  | 5/1985 | ............ B01J/33/00 |
| EP | 0 666 106 A |  | 8/1995 | ............ B01J/23/58 |
| EP | 0945178 A1 | * | 9/1999 | |
| EP | 0 945 178 A |  | 9/1999 | ............ B01J/23/40 |
| JP | 3193 117 |  | 8/1991 | ........... B01D/53/36 |
| WO | WO96/22146 |  | 7/1996 | ........... B01D/53/68 |
| WO | 9622150 | * | 7/1996 | |
| WO | WO 96/22150 |  | 7/1996 | ........... B01D/53/88 |
| WO | WO 97/11769 |  | 4/1997 | ........... B01D/53/88 |
| WO | 9802235 | * | 1/1998 | |
| WO | WO 98/02235 |  | 1/1998 | ........... B01D/53/86 |

* cited by examiner

Primary Examiner—Stanley S. Silverman
Assistant Examiner—Timothy C. Vanoy
(74) Attorney, Agent, or Firm—Russell G. Lindenfeldar (57) ABSTRACT Method for cleaning the atmosphere by adsorbing pollutants, e.g., hydrocarbons, ozone, carbon monoxide, nitrogen oxides, sulfur oxides, etc., contained in the atmosphere. The pollutant-containing atmosphere is contacted with an outer surface of a substrate, e.g., radiators, condensers, charge air coolers, transmission coolers, etc., which has been coated with an adsorptive material such as zeolites, molecular sieves, carbon, etc. The coated substrate is protected with an overcoat of at least one porous protective material such as alumina, silica and the like, such that the pollutants will come into contact with the adsorptive material, but harmful contaminants will be prevented from contacting the adsorptive material.

13 Claims, 2 Drawing Sheets

METHOD AND DEVICE FOR CLEANING THE ATMOSPHERE

This application is a divisional of co-pending application Ser. No. 09/689,217 filed Oct. 12, 2000 which is a divisional of application Ser. No. 09/456,016 filed on Nov. 30, 1999, now U.S. Pat. No. 6,190,627.

FIELD OF THE INVENTION

The present invention relates to a method for the low temperature cleaning of the atmosphere and more particularly to the rendering of the outer surface of a substrate, such as a radiator of a motor vehicle, capable of either catalytically converting atmospheric pollutants to less harmful materials or adsorbing such pollutants without adversely affecting the functioning of the substrate. The method is accomplished through the employment of a pollutant treatment coating on the surface of such substrate said coating being further provided with an overcoating of either a protective material alone or in combination with a water repellant material which improves durability and long term performance of the catalytic or adsorptive coating.

BACKGROUND OF THE INVENTION

A review of literature relating to pollution control reveals that the general approach is to reactively clean waste streams entering the environment. If too much of one pollutant or another is detected or being discharged, the tendency has been to focus on the source of the pollutant. For the most part gaseous streams are treated to reduce the pollutants prior to entering the atmosphere.

It has been disclosed to treat atmospheric air directed into a confined space to remove undesirable components therein. However, there has been little effort to treat pollutants which are already in the environment; the environment has been left to its own self-cleansing systems.

References are known which disclose proactively cleaning the environment. U.S. Pat. No. 3,738,088 discloses an air filtering assembly for cleaning pollution from the ambient air by utilizing a vehicle as a mobile cleaning device A variety of elements are disclosed to be used in combination with a vehicle to clean the ambient air as the vehicle is driven through the environment. In particular, there is disclosed ducting to control air stream velocity and direct the air to various filter means. The filter means can include filters and electronic precipitators. Catalyzed postfilters are disclosed to be useful to treat non-particulate or aerosol pollution such as carbon monoxide, unburned hydrocarbons, nitrous oxide and/or sulfur oxides, and the like.

Another approach is disclosed in U.S. Pat. No. 5,147,429. There is disclosed a mobile airborne air cleaning station. In particular this patent features a dirigible for collecting air. The dirigible has a plurality of different types of air cleaning devices contained therein. The air cleaning devices disclosed include wet scrubbers, filtration machines, and cyclonic spray scrubbers.

The difficulty with devices disclosed to proactively clean the atmospheric air is that they require new and additional equipment. Even the modified vehicle disclosed in U.S. Pat. No. 3,738,088 requires ducting and filters which can include catalytic filters.

DE 40 07 965 C2 to Klaus Hager discloses a catalyst comprising copper oxides for converting ozone and a mixture of copper oxides and manganese oxides for converting carbon monoxide. The catalyst can be applied as a coating to a self-heating radiator, oil coolers or charged-air coolers. The catalyst coating comprises heat resistant binders which are also gas permeable. It is indicated that the copper oxides and manganese oxides are widely used in gas mask filters and have the disadvantage of being poisoned by water vapor. However, the heating of the surfaces of the automobile during operation evaporates the water. In this way, continuous use of the catalyst is possible since no drying agent is necessary.

Responsive to the difficulties associated with devices which proactively treat the atmosphere, the Assignee herein in U.S. patent application Ser. No. 08/410,445 filed on Mar. 24, 1995, now abandoned, U.S. patent application Ser. No. 08/589,182 filed Jan. 19, 1996, now abandoned, and U.S. patent application Ser. No. 08/589,030 filed Jan. 19, 1996, now U.S. Pat. No. 6,200,542 B1 issued Mar. 13, 2001, each incorporated herein by reference, disclosed apparatus in related methods for treating the atmosphere by employing a moving vehicle. In preferred embodiments, a portion of the surface of the engine or cabin cooling system (e.g., the radiator, air conditioning condenser, etc.) is coated with a catalytic or adsorptive composition. Additionally, the fan associated with the engine cooling system can operate to draw or force air into operative contact with the radiator. Pollutants contained within the air such as ozone, hydrocarbons and/or carbon monoxide are then catalytically convened to non-polluting compounds (e.g., oxygen, water and carbon dioxide).

The Assignee herein also has pending U.S. patent application Ser. No. 08/412,525 filed on Mar. 29, 1995, now abandoned, incorporated herein by reference, which discloses devices and methods for proactively treating the atmosphere catalytically by employing a stationary object such as selected surfaces of an automobile at rest, a billboard, an air conditioning unit and the like coated with a catalytic composition.

In addition, International Publication No. WO 98/02235 of the Assignee herein discloses a process of catalytically activating the surface of a heat exchange device such as a motor vehicle radiator while retaining the heat exchange properties of the device. The method enables the catalytic treatment of the atmosphere by converting pollutants contained therein to less harmful materials while allowing the radiator to perform its function normally. A polymeric protective coating which is stable up to temperatures of about 100° C. may be employed to retard degradation and inactivation of the catalyst.

The application of a catalyst or absorbent composition to the surface of a substrate such as a radiator of a motor vehicle presents problems such as the exposure of the composition to relatively high concentrations of contaminants which can deleteriously affect the functioning of the composition. Such contaminants include solid or vaporized particulates, corrosive compounds such as salts and oxides of nitrogen, sulfur and the like. Contact of the composition with such contaminants can result in masking, fouling and/or poisoning. In addition, water (and contaminants contained therein) can be a source of degradation and can also decrease the activity and useful life of catalyst and adsorbent compositions.

It would therefore be a significant advance in the art of reducing atmospheric pollution to employ catalytic and adsorptive composition coated devices for the treatment of the atmosphere to remove pollutants contained therein wherein the composition is protected against those contaminants commonly encountered in the atmosphere which can adversely affect performance of the composition. It would be a further advance in the art if the composition could be protected from contaminants at from ambient temperatures up to about several hundred degrees centigrade. It would be still a further advance in the art if the composition could be protected from water especially liquid water.

SUMMARY OF THE INVENTION

The present invention generally relates to a method and device for cleaning the atmosphere by removing pollutants therefrom. A surface which contacts the atmosphere such as a surface of a radiator of a motor vehicle is treated with a catalyst or absorbent composition so that the outer surface (i.e., air side) thereof is capable of either adsorbing pollutants or catalytically converting pollutants contained in the atmosphere into less harmful substances. The composition is coated at least in part (preferably completely) with a porous, protective coating as defined herein which effectively protects the composition from atmospheric contaminants at ambient temperatures up to several hundred degrees centigrade or higher. Preferably, the porous protective coating is itself overcoated with a hydrophobic material. The present invention also encompasses devices treated in the manner described herein.

The term "adsorption" is defined as including: (a) the penetration of one substance into the inner structure of another (commonly referred to as "absorption"); and (b) adherence of the atoms, ions, or molecules of a gas or liquid to the surface of another substance (commonly referred to as "adsorption"). See, for example, *Hawley's Condensed Chemical Dictionary*, Thirteenth Edition, Van Nostrand Reinhold, 1997, pp. 2, 3, 24.

Similarly, related terms such as, for example, adsorbents, adsorbing, adsorptive, etc. shall be understood to include both related meanings. The term "atmosphere" means the mass of air surrounding the earth, and includes "ambient air" which is the portion of the atmosphere that is drawn or forced towards the outer surface of the coated substrate. Ambient air includes air, which has been heated either incidentally or by a heating means. The term "substrate" is used in its customary broad sense and includes any surface which can be coated with a suitable catalyst or adsorbing composition and thereafter have the composition protected in the manner described herein. Such surfaces include those surfaces found in motor vehicles such as automobiles, trucks, vans, buses, trains, airplanes and the like and include but are not limited to radiators, condensers, charge air coolers, transmission coolers, inserted devices which may be separately heated, heat exchangers, fluid transporting conduits and the like. Surfaces normally described as stationary such as billboards, road signs, outdoor HVAC equipment are also included. For convenience only, a motor vehicle radiator will be discussed herein as typical of a suitable substrate.

In accordance with the present invention, the surface of the substrate (e.g., radiator) is provided with a substance which can either effectively catalyze the conversion of pollutants contained in the atmosphere to less harmful substances or adsorb such pollutants for later treatment as appropriate. The surface of the radiator is therefore capable of either catalytically converting pollutants such as hydrocarbons, carbon monoxide and ozone into less harmful materials such as oxygen, carbon dioxide and water, or adsorbing pollutants such as NOx, SOx hydrocarbons and carbon monoxide as the case may be.

In one aspect, the present invention is directed to a method of catalytically treating the atmosphere to convert pollutants to less harmful materials comprising treating an outer surface of a substrate, particularly an auto radiator to render said surface capable of catalytically converting said pollutants and then providing the catalyst with an overcoating of at least one material or mixtures of such materials which is porous and preferably also adsorbent (hereinafter, "porous protective material"). The porous protective material is preferably sufficiently porous to enable the atmosphere including the contained pollutants to be treated to pass therethrough into operative contact with the catalyst composition to enable conversion thereof into less harmful materials. The porous protective material preferably should also be adsorbent in order to trap atmospheric catalyst degradating contaminants so that they are at least substantially prevented from reaching the catalyst composition. Still further, the catalyst and the porous protective material are preferably stable at ambient temperatures and up to about several hundred degrees centigrade.

In another aspect of the invention, the porous protective material may include or be overcoated with at least one substance which is capable of protecting the catalyst composition from contact with liquid water and/or water vapor (hereinafter, "hydrophobic protective material").

In another aspect of the invention, the outer surface of the substrate (e.g. radiator) is made of or provided with a catalytically active substance such as a base metal catalyst (e.g. manganese dioxide), precious metal catalyst or combination thereof. As used herein the terms "base metal catalyst" and "precious metal catalyst" shall include the base metals and precious metals themselves as well as compounds containing the same e.g., salts and oxides and the like.

In another aspect, the present invention is directed to a method for cleaning the atmosphere comprising treating an outer surface of a substrate, particularly an auto radiator with an adsorptive material to render said surface capable of adsorbing pollutants present in the atmosphere such as NOx, SOx hydrocarbons and carbon monoxide and then providing the adsorptive material with an overcoating of at least one porous protective material.

In another aspect of the invention, the outer substrate surface coated with either a catalyst composition or adsorbing composition, is coated with the porous protective material which is then overcoated with a hydrophobic protective material. The protective material, whether porous, hydrophobic or a combination of both still permits pollutants to pass into contact with either the catalyst composition so they may be converted to less harmful materials or into contact with the adsorbing composition so that they may be absorbed and thereby removed from the atmosphere.

The coatings contemplated for use herein do not substantially interfere with the normal desired operation of the substrate (e.g., auto radiator) whose surface has been coated.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to a method of cleaning the atmosphere by treating the surface of a substrate (e.g. a motor vehicle radiator) so that pollutants contained in ambient air upon contact with said surface may either be readily converted catalytically to less harmful materials or removed by adsorption. For example, (a) the surface of the substrate may be rendered catalytic if the surface is provided with catalytically active materials or a catalyst composition or the surface itself may be made of a catalytically active material; or (b) an adsorptive composition may be applied to the surface of the substrate. Thus, the present invention is particularly adapted to either the catalytic conversion of hydrocarbons, ozone and carbon monoxide into less harmful materials such as oxygen, carbon dioxide and water or the removal of e.g., NOx, SOx, hydrocarbons and carbon monoxide by adsorption.

In accordance with the present invention, the surface coat of the catalyst or adsorptive composition is overcoated with a porous protective material which is porous and adsorbent. The term "porous" means that the material allows the ambient air containing pollutants such as hydrocarbons, ozone, carbon monoxide and the like to pass through the porous protective material to effectively contact the catalyst and adsorptive composition and thereby be converted to less harmful materials. The term "adsorbent" when used herein means that undesirable contaminants such as particulate matter, high molecular weight hydrocarbons, water borne salts, aerosols, gases (e.g. NOx, SOx), and the like which can mask, foul and/or poison the catalyst composition or interfere with the functioning of the adsorptive composition are adsorbed, trapped and may be retained in the porous protective material so that they are maintained out of contact with the underlying active composition.

In a further aspect of the present invention, the porous protective material may optionally include or may be overcoated with a hydrophobic material which substantially prevents water (liquid or vapor) from contacting the catalytic or adsorptive composition. It has been observed that in the presence of liquid water and the contaminants that may be contained therein, degradation of the catalyst composition is accelerated and conversion rates of pollutants to less harmful materials are more quickly degraded than in the absence of liquid water and the contained contaminants. It is anticipated that adsorptive compositions will similarly benefit from protection from water.

In a still further aspect of the invention, the catalytic or adsorptive composition coated on the substrate may first be coated with the hydrophobic protective material and the porous protective material is coated over it.

For reasons of convenience, the invention will be further described and exemplified using its catalytic embodiment. Those skilled in the art will appreciate that the adsorptive embodiment of the invention can be substituted and applied and utilized in a substantially similar manner as described for the catalytic embodiment using substantially similar techniques.

The atmosphere contacting surface is the outer surface of any device such as a motor vehicle radiator which can effectively receive the catalyst composition and overcoat of the protective material(s) and which comes into contact with a pollutant-containing gas such as ambient air. Any device in which there is a flow of ambient air thereover or therethrough may be treated in accordance with the present invention. Of particular importance to the present invention is the rendering of the outer surface of the substrate (e.g., radiator) capable of catalytically converting pollutants to less harmful materials without adversely affecting the substrate and its function. Thus, if the substrate is a radiator, the catalyst composition and protective material overcoat(s) shall not substantially adversely affect either the heat exchange properties or the physical integrity of the radiator. The catalyst composition is protected by at least one porous, preferably adsorbent protective material to insure against premature degradation of the catalyst composition and optionally one hydrophobic protective material to protect the catalyst composition from water (liquid and/or vapor). The porous protective material and the hydrophobic protective material may also be mixed and coated onto the catalyst composition as one layer.

A particular embodiment of the present invention is directed towards protective materials and methods for improving the durability of catalysts used for treating the atmosphere. Such catalysts include, for example, ozone converting catalytic compositions (especially compositions containing $MnO_2$), and catalysts useful for treating carbon monoxide and hydrocarbons as well. Manganese dioxide is a particularly preferred catalyst material for use in the present invention to treat ozone, and precious metals such as platinum and/or palladium are preferred to treat hydrocarbons and carbon monoxide.

In this embodiment, the invention is specifically directed to the use of protective materials which may be overcoated on catalytic systems (e.g., catalyst coated automobile radiators) which are useful for cleaning the atmosphere by catalytically treating pollutants contained in the atmosphere. The function of the protective materials is to prevent atmospheric catalyst degrading contaminants (e.g., solid or aerosol particulates, water, SOx, NOx, water borne salts, high molecular weight hydrocarbons, etc.) which lead to masking, fouling, and/or poisoning of the catalyst composition from interacting with the catalyst composition. Since the purpose of an automobile radiator is to provide heat exchange and cooling for the engine, the radiator is usually located at the front of the vehicle where it has ample access to large volumes of ambient air. As a result, the radiator operates in a relatively dirty environment and is exposed to all types of solid, gaseous and liquid airborne and roadway contaminants. A catalyst composition applied to the radiator for purposes of treating atmospheric pollutants such as ozone should preferably be able to function over an extended period of time in a severely dirty environment. Long term road tests of ozone destruction catalysts applied to automobile radiators have shown that deactivation of catalyst performance occurs over time as the mileage on the vehicle increases. Visual inspection of prior art radiators which had been surface coated only with an ozone catalyst, e.g., a $MnO_2$ containing catalyst and removed from service after extended on-road aging (e.g., 50,000 or 100,000 miles) showed the readily apparent deposition of dirt, salts, and other solid contaminants on the surface of the catalyst composition. These unprotected compositions suffered a significant loss of activity measured at about 50% or higher. Chemical analyses also confirmed the deposition of sulfate, sodium, chloride, calcium, silica, alumina and carbon on the catalyst composition. Although many mechanisms may exist for deactivation of such road-aged catalysts, it is believed that deposition of atmospheric contaminants (particularly SOx aerosols, and particulate matter both large and small) account for a significant decrease in catalyst performance over time.

The practice of the methods of the present invention minimize contact of airborne contaminants with the radiator catalyst composition. This is accomplished by applying an overcoat of a porous, preferably adsorbent protective material on the surface of the catalyst composition. The function of the porous protective material is to trap and hold airborne particulates, high molecular weight hydrocarbons, aerosols, water borne salts and catalyst deactivating gases such as SOx, so that they do not come into contact with the active catalyst composition underneath. The porous protective material is preferably dense enough to trap contaminants but also porous enough to allow free passage of the ambient air which contains the pollutant to be treated (e.g. ozone, hydrocarbons, carbon monoxide) to the catalyst composition below. In this way, the catalyst composition is kept substantially contaminant free and is therefore able to provide high levels of long lasting pollutant conversion.

Suitable porous protective materials may include, but are not limited to zeolites, clays, alumina, silica, alkaline earth oxides, rare earth oxides, carbon, inert metal oxides as well as mixtures thereof.

The zeolites for use in the present invention as the protective material include acid and/or ion exchanged and/or dealuminated zeolites examples of such zeolites include but are not limited to zeolite-Y, ferrierite, zeolite-A, beta-zeolite, ZSM-5, other molecular sieves and mixtures thereof.

Clays include, for example, attapulgite, kaolin and mixtures thereof.

Aluminas include, silica alumina, gamma alumina, alpha alumina, colloidal alumina, and mixtures thereof including those having high and low surface areas.

Typical useful silicas include silicalite, silica gel, fumed silica, aerogels, high silica content silica-aluminas, colloidal silica and mixtures thereof.

Examples of useful alkaline earth oxides include calcium oxide/hydroxide, calcium magnesium aluminates, barium carbonate, barium oxide/hydroxide, strontium carbonate, strontium oxide/hydroxide, spinels and mixtures thereof.

Typical and useful rare earth oxides include ceria, lanthana and mixtures thereof.

Examples of carbon for use in the present invention include granular activated carbon, carbon black, permanganate on carbon and mixtures thereof.

In addition to the examples mentioned above inert metal oxides such as, for example, titania, zirconia, silica, and mixtures thereof can be employed as the protective material.

The preferred porous protective material for use in the practice of the invention is aluminum oxide, more preferred is high surface area silica containing aluminum oxide Protective materials may optionally also be combined with and may include hydrophobic substances which render the area around the catalyst composition water repellant. The hydrophobic material may also be provided as a separate overcoat either over or under the porous component. Suitable hydrophobic substances for use in the present invention include, but are not limited to water-dispersible polymers, polymer emulsions such as fluoropolymer water based latex emulsions ("FC-824" and "FC-808" manufactured by 3M Company) and water-based "TEFLON" emulsions (e.g., "TF5035" manufactured by 3M Company), and silicone polymers, such as water based silicone emulsions (e.g. "BS-1306" and "BS-1001A" manufactured by Wacker Silicones Corp.). The protective material, as more fully explained hereinafter, may be applied by any number of methods such as dipping or spraying a slurry containing the protective material. The porous protective material and the optional hydrophobic protective material may each be applied in separate layers to the catalytic surface or they may be applied as a mixture.

The protective material may be employed to cover a variety of catalyst compositions. As previously indicated, such catalyst compositions include base metals, precious metals, salts and oxides thereof and combinations thereof. Manganese dioxide is an especially preferred catalytic material especially for the conversion of ozone. It is also anticipated that manganese dioxide will itself be useful as the porous protective material for overcoating and protecting catalyst coatings when practicing the catalytic embodiment of the invention.

The base metals which may be employed for the catalyst composition include all base metals which can effectively convert ozone to oxygen and/or carbon monoxide to carbon dioxide. The preferred base metals include manganese, iron, copper, chromium, and zinc compounds containing the same and combinations thereof. The base metals are typically used in the form of oxides.

The precious metals are preferably selected from those customarily used in catalyst compositions for the purification of engine exhaust, e.g., platinum, palladium, rhodium and mixtures thereof. Silver and gold may also be used.

The catalyst composition may also be provided with a suitable support material which preferably has a high surface area. The preferred support materials are refractory oxides such as those selected from the group consisting of ceria, alumina, titania, silica, zirconia, and mixtures thereof with alumina being the most preferred refractory oxide support. It is preferred that the refractory oxide support have a high surface area to maximize the amount of the catalytic material within a given unit area. The term "high surface area" as it pertains to the refractory oxide support shall generally mean that the surface area of the support is at least 100 m$^2$/g preferably in the range of from about 100 to 300 m$^2$/g.

The catalyst composition may be applied to the radiator surface by techniques commonly used in the industry, e.g., dipping and/or spraying.

The catalyst compositions described above once deposited or made part of the substrate are then protected with at least one protective material, preferably, a porous material having adsorbent properties and mixtures thereof as described above. The porous protective material may be in the form of a single layer or multiple layers lying between the catalyst composition and the atmospheric airflow containing the pollutants which are to be treated. The same or different protective materials may be used for the multiple layer configuration optionally including one or more layers of a hydrophobic protective material as described previously. For example, the catalyst composition as deposited on the surface of the substrate may be overcoated with one or more layers of a porous protective material such as alumina with the alumina coating optionally having one or more layers of a hydrophobic protective material (e.g. latex based emulsion) coated thereover.

In an alternative embodiment, the protective materials may encapsulate the catalyst composition. Such encapsulated catalyst compositions may be prepared by coating individual particles of the catalyst composition by dipping or spraying with a slurry containing one or more protective materials, e.g., the porous protective material and/or the hydrophobic protective material.

In operation of the present invention, ambient air is drawn or forced over the catalytic surface by natural wind currents or by air drawing devices such as fans. For land use motor vehicles, the radiator surfaces are preferably the surfaces which are coated with the catalyst composition, and the air drawing device is the motor vehicle radiator fan. It should be understood, however, that other substrates such as air conditioning condensers, charge air coolers, transmission coolers, inserted devices which may be separately heated and the like may be treated in a like manner.

In a preferred embodiment of the present invention, the atmosphere contacting surfaces are appropriate surfaces of a motor vehicle radiator, particularly in automobile radiator. By treating the radiator surface as described herein pollutants can be readily removed from the atmosphere while the catalyst is able to maintain useful conversion rates for extended periods of time. The normal function of the radiator is not substantially affected by the coating(s).

Figure 1A:
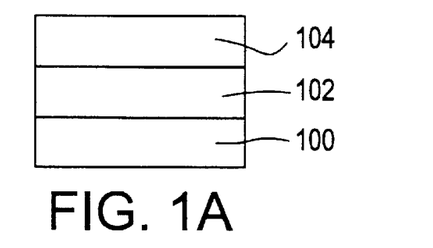
FIGS. 1A–1F are cross-sectional views showing various arrangements of the catalyst or adsorbing composition and protective material of the present invention.
Figure 1B:
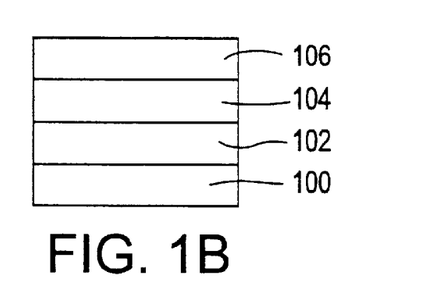
Figure 1C:
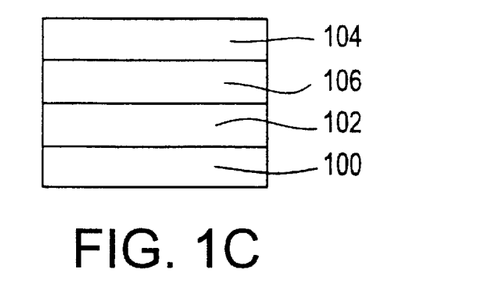
Figure 1D:
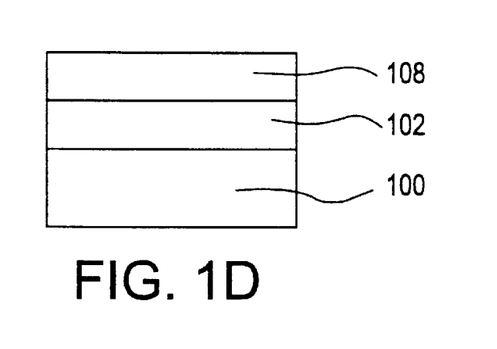
Figure 1E:
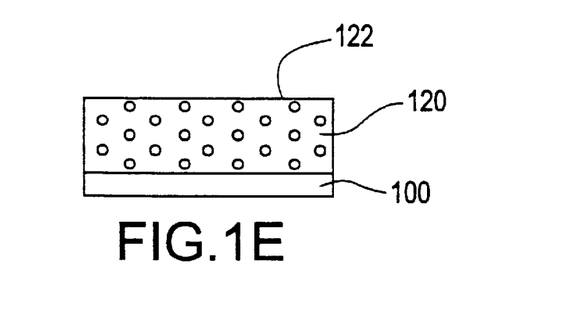
Figure 1F:
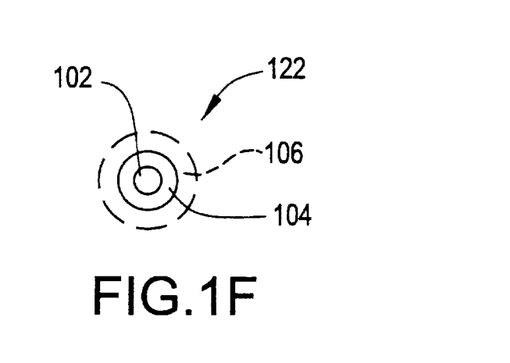
Figure 2:
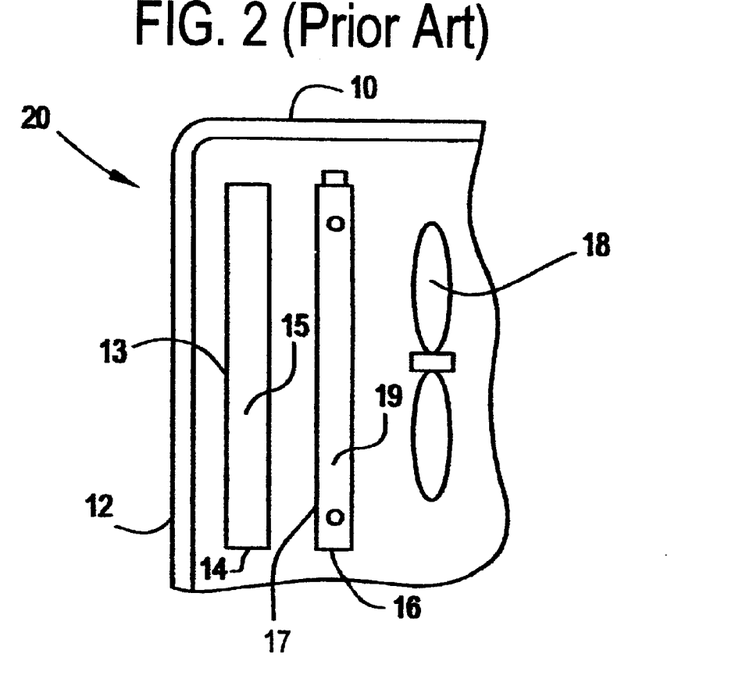
FIG. 2 is a side view of a radiator assembly of a motor vehicle.
Figure 3:
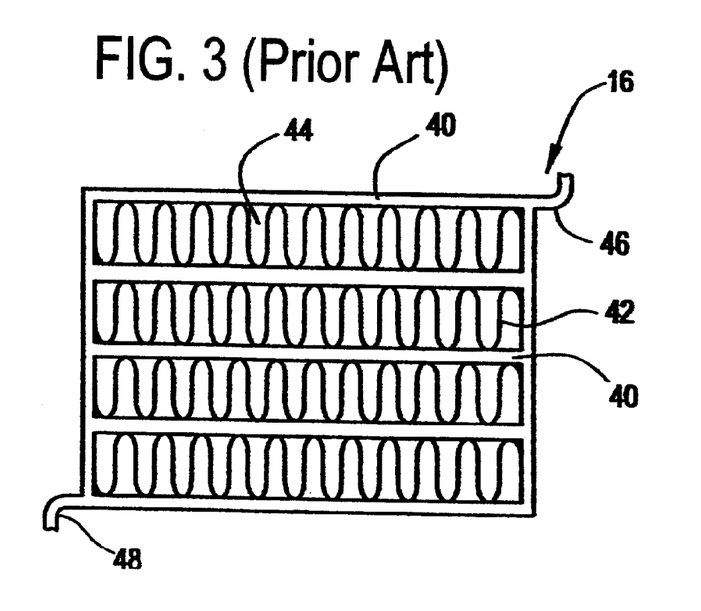
FIG. 3 is an enlarged cross-sectional view of a motor vehicle radiator.

The present invention will be better understood by those skilled in the art by reference to accompanying FIGS. 1–3. What is particularly important in accordance with the present invention is that the catalyst composition is protected from degrading contaminants by the application of at least one protective material as described herein. As the ambient air encounters the catalytic surface of e.g., the radiator, hydrocarbons, carbon monoxide and/or ozone are catalytically reacted to produce less harmful materials such as oxygen, carbon dioxide, and water vapor. Additionally, gaseous contaminants such as high molecular weight hydrocarbons, SOx and NOx and other contaminants such as dirt, carbon, aerosols, particulates, water, water borne salts, soil and the like are kept away from the catalyst composition through the use of the protective material(s).

It will be appreciated by those skilled in the art that when the substrate is associated with a vehicle, any suitable vehicle can be employed. Vehicles include cars, trucks, trains, boats, ships, airplanes, dirigibles, balloons, and the like. Preferably in a motor vehicle, the atmosphere contacting surfaces are surfaces located toward the front of the vehicle in the vicinity of the cooling system fan. Useful contact surfaces include the outside (i.e. airside) surfaces of the radiator, air conditioner condenser, and the like which are all located and supported within the housing of the vehicle.

In a preferred embodiment of the invention the protective material includes a hydrophobic substance which functions to protect the catalyst composition from liquid water and/or water vapor. The hydrophobic protective material is preferably applied as a separate layer or layers either directly over the porous protective overcoat coated on the catalyst composition or indirectly thereover (i.e. wherein the hydrophobic protective material coating layer is between the catalyst composition surface coating and the porous protective material layer). As an alternative, the hydrophobic substance may be incorporated into one or more porous protecting material coating layers, or may be used in conjunction with one or more other protective materials to encapsulate the catalyst and/or adsorbent composition prior to coating the support. The hydrophobic substance may also be used as the only protective material to overcoat the catalyst or adsorptive substrate coating.

The hydrophobic protecting material can prevent liquid water and/or water vapor from contacting the catalyst composition and is at least substantially stable under the temperature conditions typically associated with a substrate such as a motor vehicle radiator. The hydrophobic protecting material will be stable at temperatures from about 0 to 300° C., preferably 0 to 200° C., more preferably 0 to 150° C. and most preferably 0 to 100° C.

Various arrangements of the protective material optionally including a hydrophobic substance and the catalyst composition are shown in FIGS. 1A–1E. Although single overcoats of the porous and hydrophobic protective coatings and the components thereof are depicted in the Figures, it will be appreciated that multiple coats either alternating or continuous are also within the scope of the invention.

Referring to FIG. 1A there is shown a first arrangement in accordance with the present invention in which a substrate 100, such as a radiator, is coated with a catalyst or adsorptive (collectively hereinafter, "active") composition layer 102 and a coating layer 104 thereover comprising a porous, adsorbent material such as alumina, silica or mixture thereof.

The present invention may optionally provide for a hydrophobic layer as described previously. Referring to FIGS. 1B–1D and first to FIG. 1B, the hydrophobic layer 106 is placed above the coating layer 104. The hydrophobic layer 106 provides water repellency to the substrate and thereby prevents water from adversely affecting the active composition.

In an alternative embodiment, the hydrophobic layer 106 is placed between the coating layer 104 and the active composition 102 as shown in FIG. 1C. In a still further embodiment the protective material (e.g. alumina) used for the coating layer 104 and the hydrophobic material (e.g. polymeric silicones or fluoropolymers) are combined into a single layer 108 as shown specifically in FIG. 1D.

In a further alternative embodiment individual particles of the active composition are encapsulated by the protective material as shown in FIGS. 1E and 1F typically by spray drying the particles with the protective material. Such spray drying techniques are well known in the art. In particular as shown specifically in FIG. 1E the substrate 100 has thereon one or more layers 120 comprised of encapsulated particles 122 which, as shown in FIG. 1F are comprised of the active composition 102 with at least one protective layer 104 thereover optionally with at least one layer 106 of a hydrophobic substance.

The application of the active composition and protective materials is described with reference to FIGS. 2 and 3. A radiator assembly of a motor vehicle is shown in FIG. 2 including a housing 10, a grille 12, an air conditioner condenser 14, a radiator 16 and a radiator fan 18. It will be understood that other vehicle components are typically found in a motor vehicle.

Referring to FIG. 2, the preferred atmosphere contacting surfaces include the air side tube 13 and fin 15 surfaces of the air conditioning condenser 14, as well as the air side tube 17 and fin 19 surfaces of the radiator 16. These surfaces are located within the housing 10 of a motor vehicle. They are typically under the hood of the motor vehicle between the front of the vehicle and the engine. The air conditioner condenser 14 and the radiator 16 can be directly or indirectly supported by the housing 10 of the vehicle.

The surfaces 13, 15 and 17, 19 of the air conditioner condenser 14 and the radiator 16, respectively can be treated in accordance with the present invention to provide a catalytic or adsorptive surface covered with a protective material as described above in connection with FIGS. 1A–1E. The most preferred atmosphere contacting surface is the outer surface of the radiator 16. A typical radiator has front and rear surfaces with spaced apart flat tubes having therebetween a plurality of radiator corrugated plates. More specifically and referring to FIG. 3, there is shown a radiator 16 including spaced apart tubes 40 for the flow of a first fluid and a series of corrugated plates 42 therebetween defining a pathway 44 for the flow of a second fluid transverse to the flow of the first fluid. The first fluid such as antifreeze is supplied from a source (not shown) to the tubes 40 through an inlet 46. The antifreeze enters the radiator 16 at a relatively high temperature through the inlet 46 and eventually leaves the radiator through an outlet 48. The second fluid such as air passes through the pathway 44 and thereby comes into heat exchange relationship with the first fluid passing through the tubes 40.

In accordance with the present invention, the surfaces of the corrugated plates 42 of the radiator 16 can be treated to provide a catalytic or adsorptive surface which is protected from contaminants including particulate matter, gases, water and the like.

As previously discussed, another embodiment of the invention is specifically directed to the use of protective materials which may be overcoated on adsorptive systems (e.g., automobile radiators coated with adsorptive compositions) which are useful for cleaning the atmosphere by adsorbing pollutants particularly hydrocarbons contained in the atmosphere. The function of the protective materials is to prevent adsorptive material degrading contaminants present in the atmosphere (in particular solid or aerosol particulates, water, water borne salts and high molecular weight hydrocarbons) which would lead to masking, fouling, and/or poisoning of the adsorptive composition from interacting with the adsorptive material. Since the purpose of an automobile radiator is to provide heat exchange and cooling for the engine, the radiator is usually located at the front of the vehicle where it has ample access to large volumes of ambient air. As a result, the radiator operates in a relatively dirty environment and is exposed to all types of solid, gaseous and liquid airborne and roadway contaminants. An adsorptive material applied to the radiator for purposes of adsorbing atmospheric pollutants such as hydrocarbons and carbon monoxide should preferably be able to function over an extended period of time in a severely dirty environment.

The practice of the methods of the present invention minimize contact of airborne contaminants with the radiator adsorptive composition. This is accomplished by applying an overcoat of a porous, preferably adsorbent protective material on the surface of the adsorptive composition. The function of the porous protective material is to trap and hold airborne particulates, aerosols, water borne salts and high molecular weight hydrocarbons so that they do not come into contact with the adsorptive material underneath. The porous protective material is preferably dense enough to trap contaminants but also porous enough to allow free passage of the ambient air which contains the pollutant to be treated (e.g., hydrocarbons, carbon monoxide) to the adsorptive composition below. In this way, the adsorptive composition is kept substantially contaminant free and is therefore able to provide high levels of long lasting pollutant adsorption. Useful and preferred adsorptive materials/compositions include zeolites such as acid and/or ion exchanged and/or dealuminated zeolites examples of such zeolites include but are not limited to zeolite-Y, ferrierite, zeolite-A, beta-zeolite, ZSM-5, other molecular sieves and mixtures thereof; carbon and Group IIA alkaline earth metal oxides such as calcium oxide. The adsorbed pollutants may be subsequently collected, if desired, by desorption, for example, followed by destruction by catalytic reaction or incineration.

EXAMPLE 1

A "FORD TAURUS" radiator was coated in four separate sections ("quadrants") with four $MnO_2$ based ozone-destroying catalyst formulations. A brief description of each formulation is given below: Section 1: same as Section 2 formulation without the alumina coating. A brief description of each formulation is given below: Section 1: same as Section 2 formulation without the alumina coating.

Section 2. 3.5 $\mu$m average particle size $MnO_2$ coating containing a silicone/acrylic binder blend and overcoated with an "SRS-II" alumina coating.

Section 3: 3.5 $\mu$m particle size reference $MnO_2$ coating prepared from an unstable (i.e. coagulated) slurry formulation.

Section 4: 1 $\mu$m average particle size $MnO_2$ coating containing an acrylic binder without the alumina overcoat.

The $MnO_2$ binder system used in the Section 1 and 2 formulations contained a 3:1 blend of acrylic/styrene acrylic latex binder ("RHOPLEX P-376" from Robin & Han) with a reactive silicone latex binder resin ("M-50E" from Wacker Silicones Corp.). The $MnO_2$ binder system used in the non-preferred reference Section 3 formulation contained an EVA (ethylene vinyl acetate) latex binder from National Starch ("DUROSET E-646"). The $MnO_2$ binder system used in the Section 4 formulation contained an acrylic latex binder from National Starch ("ACRYLIC X-4280"). The "SRS-II" alumina binder system used in the overcoat formulation coated on Section 2 contained an acrylic/styrene acrylic latex binder from Robin & Han ("RHOPLEX P-376"). The "SRS-II" alumina was purchased from Grace. The BET surface area of this material was ca. 300 $m^2$/g and it contained approximately 5% silica. The mean particle size was approximately 7.5 um as measured by a "HORIBA LA-500" Laser Diffraction Particle Size Distribution Analyzer. The alumina overcoat was applied at a loading of ca. 0.22 $g/in^3$ of radiator volume. The $MnO_2$ catalyst loadings were approximately 0.44 $g/in^3$ of radiator volume.

The coated radiator was placed within an air duct and subjected to long term aging in the presence of continuous ambient airflow. The airflow entering the radiator was maintained at an approximate 9.5 mph linear velocity (ca. 600,000/h radiator space velocity). The radiator was heated internally with hot recirculating coolant (50:50 mixture of antifreeze and water), and the coolant temperature entering the radiator was maintained between 70 and 90° C. depending on the ambient air temperature. Because of low ambient air temperature, a fraction of the air exiting the radiator was recirculated back to the radiator inlet in order to maintain the radiator coolant temperature between 70 and 90° C.

Ozone conversion of the four different catalyst compositions was measured periodically to assess any deactivation in performance over time. This was accomplished by placing the radiator in a different test rig (air duct system) than was used to complete the long-term aging. Ozone conversion was measured at three different airflows corresponding to radiator space velocities of 200,000, 400,000 and 600,000/h. Additionally, ozone conversion was measured at three different temperature conditions ("90° C.", "75° C.", and 45° C.). For the 90° C. temperature condition, the radiator test rig was operated in "single-pass" airflow mode where 100% of the air entering the radiator was fresh ambient air. In this configuration the coolant temperature to the radiator was maintained at 90° C. The ambient air entering the radiator was preheated to ca. 20–40° C. with an air pre-heater (in order to achieve the 90° C. coolant temperature), and the air temperature exiting the radiator was allowed to vary as the airflow was changed during the ozone conversion measurements (i.e. the higher the airflow the lower the air temperature). For the other temperature conditions used to measure ozone destruction performance, the test rig was operated in "full circulation" airflow mode where the air exiting the radiator was recirculated back to the radiator inlet. In this configuration, the air exiting the radiator was maintained at a constant 45 or 75° C. while ozone conversion measurements were taken at different airflows.

Initial conversion results for the four catalyst coating formulations are shown in Table 1. Initial conversions for Sections 1, 3, and 4 were virtually identical (e.g., 85% at 600,000/h space velocity and the 90° C. coolant condition), but the overcoated sample of Section 2 was ca. 6% lower (78%, respectively). The radiator was aged for 14 days at ambient temperature conditions (i.e. the coolant heaters were turned off) and then the radiator was aged an additional 25 days at normal operating temperature (i.e. 70–90° C.). Ozone conversion results at the completion of aging are shown in Table 2.

After aging, the Section 3 coating containing the non-preferred reference catalyst formulation typically had the lowest conversion (e.g., 37% at 600,000/h space velocity and the 90° C. coolant temperature condition). The Section 4 coating containing the small particle catalyst formulation was slightly better (41%, respectively), and the Section 1 coating containing the larger particle catalyst formulation was better yet (46%, respectively). The Section 2 coating with the overcoated catalyst formulation, however, was significantly better (65%, respectively). At the 90° C. temperature test condition, the Section 2 catalyst formulation lost only an absolute 13% in ozone conversion activity during the entire aging period while the other three lost at least an absolute 40% (Table 3). Clearly, the "SRS-II" alumina overcoat on the Section 2 coating had a dramatic effect on improving the long-term durability of the $MnO_2$ catalyst underneath. This is particularly significant since the initial activity of the Section 2 coating was less due to the presence of the overcoat. Despite a reduction in initial activity, the long-term activity maintenance was excellent.

TABLE 1

| Temperature (° C.) | Space Velocity (/h) | Ozone Conversion (%) | | | |
|---|---|---|---|---|---|
| | | Section 1 | Section 2 | Section 3 | Section 4 |
| 90 | 600,000 | 85.0 | 78.3 | 84.5 | 85.0 |
| | 400,000 | 91.4 | 86.4 | 90.9 | 90.7 |
| | 200,000 | 95.5 | 92.9 | 98.9 | 95.3 |
| 75 | 600,000 | 92.8 | 85.6 | 92.4 | 88.0 |
| | 400,000 | 94.7 | 91.0 | 94.7 | 92.1 |
| | 200,000 | 97.2 | 95.2 | 97.6 | 96.7 |
| 45 | 600,000 | 82.2 | 73.1 | 81.9 | 80.1 |
| | 400,000 | 89.4 | 82.8 | 89.1 | 87.1 |
| | 200,000 | 96.8 | 93.2 | 96.4 | 95.0 |

TABLE 2

| Temperature (° C.) | Space Velocity (/h) | Ozone Conversion (%) | | | |
|---|---|---|---|---|---|
| | | Section 1 | Section 2 | Section 3 | Section 4 |
| 90 | 600,000 | 46.1 | 65.0 | 37.0 | 41.0 |
| | 400,000 | 53.7 | 73.0 | 45.0 | 50.5 |
| | 200,000 | 74.4 | 87.5 | 65.5 | 74.4 |
| 75 | 600,000 | 42.7 | 62.9 | 33.4 | 38.3 |
| | 400,000 | 49.0 | 70.0 | 39.9 | 44.6 |
| | 200,000 | 67.1 | 84.0 | 58.3 | 59.9 |

TABLE 2-continued

| Temperature (° C.) | Space Velocity (/h) | Ozone Conversion (%) | | | |
|---|---|---|---|---|---|
| | | Section 1 | Section 2 | Section 3 | Section 4 |
| 45 | 600,000 | 25.4 | 46.2 | 21.3 | 22.5 |
| | 400,000 | 32.3 | 55.5 | 26.4 | 27.0 |
| | 200,000 | 49.9 | 75.5 | 42.2 | 39.2 |

TABLE 3

| | Ozone Conversion %[a] |
|---|---|
| Section 1 Fresh | 85.0 |
| Section 1 Aged | 46.1 |
| Section 2 Fresh | 78.3 |
| Section 2 Aged | 65.0 |
| Section 3 Fresh | 84.5 |
| Section 3 Aged | 37.0 |
| Section 4 Fresh | 85.0 |
| Section 4 Aged | 41.0 |

[a]Ozone Conversion Test Conditions 90° C. Coolant Temperature, 600,000/hr Space Velocity, ca 200 ppb ozone.

EXAMPLE 2

"VOLVO S-70" and "S-70I" (turbo) radiators were coated in three separate sections ("stripes") with three $MnO_2$ based ozone-destroying catalyst formulations. A brief description of each formulation is given below.

Section 1: 3.5 μm average particle size $MnO_2$ coating containing a silicone/acrylic binder tend and overcoated with "SRS-II" alumina.

Section 2: same as Section 1 formulation without the alumina overcoat.

Section 3: 3.5 μm average particle size $MnO_2$ coating containing a silicone/acrylic binder blend and overcoated with "SRS-II" alumina.

The $MnO_2$ binder system used in the Section 1 and 2 formulations contained a 3:1 blend of acrylic/styrene acrylic latex binder ("RHOPLEX P-376" from Robin & Haas) with a reactive silicone latex binder resin ("M-80E" from Wacker Silicones Corp.). The $MnO_2$ binder system used in the Section 3 formulation contained a 1:1 blend of acrylic/styrene acrylic latex binder ("RHOPLEX P-376" from Robin & Hass) with an EVA (ethylene vinyl acetate) latex binder from National Starch ("DUROSET ELITE 22"). The "SRS-II" alumina binder system used in the overcoat formulations coated in Sections 1 and 3 contained only the acrylic/styrene acrylic latex binder ("RHOPLEX P-376") from Robin & Hass. The "SRS-II" alumina was purchased from Grace. The BET surface area of this material was ca 300 $m^2/g$ and it contained approximately 5% silica The mean particle size was approximately 6.5 um as measured by a "HORIBA LA-500" Laser Diffraction Particle Size Distribution Analyzer. The alumina overcoats were applied at loadings of ca. 0.18 $g/in^3$ of radiator volume. The $MnO_2$ catalyst loadings were approximately 0.35 $g/in^3$ of radiator volume.

The coated radiators were placed on "VOLVO S-70" and "S-70 T" (turbo) vehicles and subjected to accelerated on-road mileage accumulation (ca. 1,000 miles per day). The radiators of both vehicles were removed after accumulating approximately 16,000 miles in the Detroit, Mich. metropoli tan area during February 1999. The ozone conversion of the coated sections on each radiator was evaluated to assess any deactivation in performance over time. The radiators were then re-installed on the vehicles and an additional 16,000 miles were accumulated on each radiator (32,000 total miles) in the Phoenix, Ariz. metropolitan area during March 1999. The radiators were once again removed, and the ozone conversion of the coated sections on each radiator was evaluated to further assess any deactivation in performance over time. Finally, the radiators were re-installed on the vehicles, and an additional 18,000 miles were accumulated on each radiator (50,000 total miles) in the Phoenix, Ariz. metropolitan area during April 1999. The radiators were removed one last time, and the ozone conversion of the coated sections on each radiator was evaluated to further assess any deactivation in performance over time.

Ozone conversion was measured by placing the radiators in a full-scale radiator test rig (air duct), heating the radiators internally with hot recirculating coolant (50:50 mixture of antifreeze and water), and blowing ozone-containing air over the radiators. Ozone conversion was measured at three different airflows corresponding to radiator space velocities of 200,000, 400,000, and 600,000/h. Additionally, the radiator test rig was operated to achieve three different temperature conditions (90° C., 75° C., and 45° C.). For the 90° C. condition, the test rig was operated in "single-pass" airflow mode where 100% of the air entering the radiator was fresh ambient air. In this configuration the coolant temperature to the radiator was maintained at 90° C. The ambient air entering the radiator was preheated to ca. 20° C. to 40° C. (in order to maintain the 90° C. coolant temperature), and the air temperature exiting the radiator was allowed to vary as the airflow was changed during the ozone conversion measurements (i.e. the higher the airflow the lower the air temperature). For the other temperature conditions used to measure ozone destruction performance, the test rig was operated in "full recirculation" airflow mode where the air exiting the radiator was recirculated back to the radiator inlet. In this configuration, the air exiting the radiator was maintained at a constant 45 or 75° C. while ozone conversion measurements were taken at different airflows.

Ozone conversion results flesh and after on-road aging for the three formulations on the "VOLVO S-70" radiator are shown in Tables 4–8. Although both of the alumina-overcoated sections had initial lower conversions, these sections showed substantially less decline in conversion with on-road aging. In fact, as illustrated in Table 8, the overcoated Section 3 catalyst formulations showed virtually no deactivation over 51,000 whereas the non-overcoated Section 2 catalyst lost an absolute 23% in ozone conversion. Although ozone conversion for the three sections was virtually identical after 32,000 miles, after 51,000 miles, both of the overcoated catalyst formulations on Sections 1 and 3 bad significantly better ozone conversion than the non-overcoated catalyst formulation on Section 2. Additional on-road aging would be expected to result in continued faster deactivation for the non-overcoated formulation relative to the two overcoated formulations.

TABLE 4

"Volvo S-70" Fresh

| Temperature (° C.) | Space Velocity (/h) | Ozone Conversion (%) | | |
|---|---|---|---|---|
| | | Section 3 | Section 2 | Section 1 |
| 90 | 600,000 | 48.4 | 61.9 | 53.3 |
| | 400,000 | 53.9 | 68.5 | 61.0 |
| | 200,000 | 65.5 | 80.2 | 71.6 |
| 75 | 600,000 | 52.6 | 65.8 | 58.3 |
| | 400,000 | 58.3 | 72.3 | 64.2 |
| | 200,000 | 70.3 | 80.0 | 75.0 |
| 45 | 600,000 | 41.7 | 51.4 | 43.5 |
| | 400,000 | 47.1 | 61.6 | 50.2 |
| | 200,000 | 63.4 | 74.5 | 67.5 |

TABLE 5

"Volvo S-70" aged 16,140 miles

| Temperature (° C.) | Space Velocity (/h) | Ozone Conversion (%) | | |
|---|---|---|---|---|
| | | Section 3 | Section 2 | Section 1 |
| 90 | 600,000 | 49.7 | 51.9 | 51.7 |
| | 400,000 | 55.0 | 61.5 | 60.0 |
| | 200,000 | 67.7 | 74.3 | 71.4 |
| 75 | 600,000 | 50.8 | 50.8 | 50.6 |
| | 400,000 | 55.8 | 59.7 | 58.3 |
| | 200,000 | 72.4 | 76.3 | 73.7 |
| 45 | 600,000 | 45.6 | 49.6 | 45.3 |
| | 400,000 | 50.8 | 52.0 | 50.1 |
| | 200,000 | 63.2 | 68.1 | 65.8 |

TABLE 6

"Volvo S-70" aged 32,087 miles

| Temperature (° C.) | Space Velocity (/h) | Ozone Conversion (%) | | |
|---|---|---|---|---|
| | | Section 3 | Section 2 | Section 1 |
| 90 | 600,000 | 47.6 | 45.7 | 46.7 |
| | 400,000 | 53.1 | 51.6 | 53.4 |
| | 200,000 | 65.9 | 65.6 | 65.6 |
| 75 | 600,000 | 48.3 | 44.1 | 47.3 |
| | 400,000 | 57.0 | 54.9 | 56.9 |
| | 200,000 | 71.4 | 67.9 | 69.5 |
| 45 | 600,000 | 44.7 | 36.9 | 38.3 |
| | 400,000 | 48.8 | 43.9 | 46.1 |
| | 200,000 | 64.7 | 57.4 | 60.0 |

TABLE 7

"Volvo S-70" aged 50,863 miles

| Temperature (° C.) | Space Velocity (/h) | Ozone Conversion (%) | | |
|---|---|---|---|---|
| | | Section 3 | Section 2 | Section 1 |
| 90 | 600,000 | 47.5 | 39.0 | 43.9 |
| | 400,000 | 54.2 | 49.6 | 53.0 |
| | 200,000 | 67.8 | 63.0 | 67.2 |
| 75 | 600,000 | 49.9 | 39.5 | 47.0 |
| | 400,000 | 60.3 | 49.9 | 54.7 |
| | 200,000 | 71.3 | 62.0 | 70.5 |
| 45 | 600,000 | 41.2 | 26.2 | 29.9 |
| | 400,000 | 47.3 | 33.3 | 40.0 |
| | 200,000 | 60.8 | 46.9 | 55.5 |

TABLE 8

| | Ozone Conversion %[b] |
|---|---|
| Section 1 Fresh | 53.3 |
| Section 1 Aged 16,140 miles | 51.7 |
| Section 1 Aged 32,087 miles | 46.7 |
| Section 1 Aged 50,863 miles | 43.9 |
| Section 2 Fresh | 61.9 |
| Section 2 Aged 16,140 miles | 51.9 |
| Section 2 Aged 32,087 miles | 45.7 |
| Section 2 Aged 50,863 miles | 39.0 |
| Section 3 Fresh | 48.4 |
| Section 3 Aged 16,140 miles | 49.7 |
| Section 3 Aged 32,087 miles | 47.6 |
| Section 3 Aged 50,863 miles | 47.5 |

[b]Ozone Conversion Test Conditions: 90° C. Coolant Temperature: 600,000 (1/hr) Space Velocity; ca. 200 ppb ozone Similar fresh and aged ozone conversion results for the same three formulations coated on the "VOLVO S-70T" radiator are shown in Tables 9–13. Although all sections showed some decline in activity with on-road aging, the overcoated sections declined at a significantly slower rate. In fact, as illustrated in Table 13, the overcoated Section 1 and 3 catalyst formulations showed an absolute loss in ozone conversion of approximately 13% after 50,000 miles whereas the non-overcoated Section 2 catalyst lost an absolute 22% in ozone conversion, in addition, after 50,000 mites, both of the alumina overcoated catalyst formulations (particularly the Section 3 catalyst) had higher conversion than the non-overcoated catalyst formulation. Additional on-road aging would be expected to result in continued faster deactivation for the non-overcoated formulation relative to the two overcoated formulations.

TABLE 9

"Volvo S-70T" Fresh

| Temperature (° C.) | Space Velocity (/h) | Ozone Conversion (%) | | |
|---|---|---|---|---|
| | | Section 3 | Section 2 | Section 1 |
| 90 | 600,000 | 67.2 | 67.0 | 60.5 |
| | 400,000 | 75.8 | 73.7 | 68.2 |
| | 200,000 | 85.1 | 85.4 | 82.0 |
| 75 | 600,000 | 62.4 | 60.7 | 53.2 |
| | 400,000 | 68.3 | 67.3 | 62.7 |
| | 200,000 | 83.1 | 82.9 | 80.2 |
| 45 | 600,000 | 53.0 | 50.7 | 43.6 |
| | 400,000 | 62.3 | 61.2 | 55.4 |
| | 200,000 | 77.4 | 76.2 | 72.2 |

TABLE 10

"Volvo S-70T" aged 16,233 miles

| Temperature (° C.) | Space Velocity (/h) | Ozone Conversion (%) | | |
|---|---|---|---|---|
| | | Section 3 | Section 2 | Section 1 |
| 90 | 600,000 | 56.8 | 50.5 | 51.1 |
| | 400,000 | 63.7 | 601 | 59.5 |
| | 200,000 | 81.8 | 78.6 | 77.4 |
| 75 | 600,000 | 57.4 | 54.2 | 52.2 |
| | 400,000 | 65.0 | 61.8 | 60.8 |
| | 200,000 | 80.4 | 77.7 | 77.0 |
| 45 | 600,000 | 47.6 | 42.5 | 40.2 |
| | 400,000 | 56.5 | 50.7 | 50.3 |
| | 200,000 | 74.7 | 69.5 | 69.8 |

TABLE 11

"Volvo S-70T" aged 32,277 miles

| Temperature (° C.) | Space Velocity (/h) | Ozone Conversion (%) | | |
|---|---|---|---|---|
| | | Section 3 | Section 2 | Section 1 |
| 90 | 600,000 | 57.7 | 48.1 | 48.7 |
| | 400,000 | 63.6 | 57.4 | 58.3 |
| | 200,000 | 76.9 | 71.5 | 72.4 |
| 75 | 600,000 | 56.9 | 50.4 | 50.3 |
| | 400,000 | 67.2 | 59.2 | 60.5 |
| | 200,000 | 79.8 | 71.7 | 73.9 |
| 45 | 600,000 | 48.4 | 37.8 | 38.0 |
| | 400,000 | 50.9 | 46.0 | 44.6 |
| | 200,000 | 66.8 | 59.3 | 58.7 |

TABLE 12

"Volvo S-70T" aged 50,173 miles

| Temperature (° C.) | Space Velocity (/h) | Ozone Conversion (%) | | |
|---|---|---|---|---|
| | | Section 3 | Section 2 | Section 1 |
| 90 | 600,000 | 54.4 | 45.0 | 46.9 |
| | 400,000 | 61.7 | 52.0 | 53.4 |
| | 200,000 | 78.0 | 69.9 | 72.0 |
| 75 | 600,000 | 55.9 | 43.1 | 46.6 |
| | 400,000 | 64.1 | 51.5 | 55.8 |
| | 200,000 | 80.0 | 69.4 | 74.4 |
| 45 | 600,000 | 42.0 | 29.9 | 32.3 |
| | 400,000 | 49.4 | 37.3 | 42.5 |
| | 200,000 | 67.1 | 53.8 | 59.8 |

TABLE 13

| | Ozone Conversion %[c] |
|---|---|
| Section 1 Fresh | 60.5 |
| Section 1 Aged 16,233 miles | 51.1 |
| Section 1 Aged 32,277 miles | 48.7 |
| Section 1 Aged 50,173 miles | 46.9 |
| Section 2 Fresh | 67.0 |
| Section 2 Aged 16,233 miles | 50.5 |
| Section 2 Aged 32,277 miles | 48.1 |
| Section 2 Aged 50,173 miles | 45.0 |
| Section 3 Fresh | 67.2 |
| Section 3 Aged 16,233 miles | 56.8 |
| Section 3 Aged 32,277 miles | 57.7 |
| Section 3 Aged 50,173 miles | 54.4 |

[c]Ozone Conversion Test Conditions: 90° C. Coolant Temperature; 600,000 (1/hr) Space Velocity; ca. 200 ppb ozone.

EXAMPLE 3

A "FORD TAURUS" radiator was coated in three separate sections ("stripes") with three $MnO_2$ based ozone-destroying catalyst formulations. A brief description of each formulation is given below.

Section 1: 3.5 μm average particle size $MnO_2$ coating containing an EVA/acrylic binder blend and overcoated with "SRS-II" alumina.

Section 2: same as Section 1 formulation without the alumina overcoat.

Section 3: 3.5 μm average particle size $MnO_2$ containing an EVA/acrylic binder blend and overcoated with "SRS-II" alumina and further overcoated with "FC-824" water repellent.

The $MnO_2$ binder system used in all sections contained a 1:1 blend of acrylic/styrene acrylic latex binder ("RHOPLEX P-376" from Robin & Hass) with an EVA (ethylene vinyl acetate) latex binder from National Starch ("DUROSET ELITE 22"). The "SRS-II" alumina binder system used in the overcoat formulations coated in Sections 1 and 3 contained only the acrylic/styrene acrylic latex binder ("RHOPLEX P-376") from Robin & Hass. The "SRS-II" alumina was purchased from Grace. The BET surface area of this material was ca. 300 m$^2$/g and it contained approximately 5% silica. The mean particle size was approximately 6.5 um as measured by a "HORIBA LA-500" Laser Diffraction Particle Size Distribution Analyzer. The alumina overcoats were applied at loadings of ca 0.22 h/in$^3$. The MnO$_2$ catalyst loadings were approximately 0.38 g/in$^3$ of radiator volume.

The "FC-824" water repellent was purchased from 3M Corporation, and it comprised a proprietary fluoropolymer latex emulsion in water. The emulsion was diluted to 2.5% solids in water and was subsequently sprayed onto the Section 3 catalyst formulation such that the catalyst coating was thoroughly wetted. Excess solution was then removed with an airknife, and the entire radiator was then dried at 90° C. for approximately 1 hour.

The coated radiator was placed on a "FORD TAURUS" vehicle and subjected to accelerated on-road mileage accumulation (ca. 1,000 miles per day). The radiator was removed after accumulating 18,000 miles in the Phoenix, Ariz. metropolitan area during April 1999. The ozone conversion of the coated sections on the radiator was evaluated to assess any deactivation in performance over time. The radiator was then re-installed on the vehicle, and an additional 18,000 miles were accumulated (36,000 total miles) in the Phoenix, Ariz. metropolitan area during May 1999. The radiator was once again removed, and the ozone conversion of the coated sections on the radiator was evaluated to further assess any deactivation in performance over time. Finally, the radiators was re-installed on the vehicle, and an additional 14,000 miles were accumulated (50,000 total miles) in the Detroit, Mich. metropolitan area during June 1999. The radiator was removed one last time, and the ozone conversion of the coated sections on the radiator was evaluated to further assess any deactivation in performance over time.

Ozone conversion was measured by the same procedure described in Examples 1 and 2.

Ozone conversion results fresh and otter on-road aging for the three formulations on the "FORD TAURUS" radiator are summarized in Table 14. Although all sections showed some decline in activity with on-road aging, the overcoated sections declined at a slower rate. As illustrated in Table 14, the overcoated Section 1 and 3 catalyst formulations showed an absolute loss in ozone conversion of 15 and 8%, respectively, after 50,000 miles whereas the non-overcoated Section 2 catalyst lost an absolute 19% in ozone conversion. Clearly, the overcoated catalyst formulations, particularly the Section 3 catalyst formulation with the combination of alumina and water repellent, deactivated the least after 50,000 miles of on-road aging. In addition, both of the overcoated catalyst formulations bad higher ozone conversion after 50,000 miles aging than the non-overcoated catalyst formulation. Additional on-road aging would be expected to result in continued faster deactivation for the non-overcoated formulation relative to the two overcoated formulations.

TABLE 14

| | Ozone Conversion %[d] |
|---|---|
| Section 1 Fresh | 84.4 |
| Section 1 Aged 18,506 miles | 77.0 |
| Section 1 Aged 36,168 miles | 74.7 |
| Section 1 Aged 50,335 miles | 69.0 |
| Section 2 Fresh | 84.7 |
| Section 2 Aged 18,506 miles | 81.1 |
| Section 2 Aged 36,168 miles | 77.0 |
| Section 2 Aged 50,335 miles | 65.7 |
| Section 3 Fresh | 76.5 |
| Section 3 Aged 18,506 miles | 70.8 |
| Section 3 Aged 36,168 miles | 73.0 |
| Section 3 Aged 50,335 miles | 68.4 |

[d]Ozone Conversion Test Conditions; 90° C. Coolant Temperature; 600,000 (1/hr) Space Velocity; ca. 200 ppb ozone.

What is claimed:

1. A method of cleaning the atmosphere by adsorbing pollutants contained in the atmosphere comprising contacting the pollutant-containing atmosphere with an outer surface of a substrate which has been coated with an adsorptive material to render said surface capable of adsorbing said pollutants, wherein the coated surface has been protected with an overcoat of at least one protective material which is sufficiently porous to enable said pollutants to pass therethrough into operative contact with the adsorptive material and sufficiently protective to prevent harmful contaminants from contacting the adsorptive material.

2. The method of claim 1 wherein the overcoated surface has been coated with at least one hydrophobic protective substance which is capable of substantially preventing liquid water and/or water vapor from reaching the adsorptive material.

3. The method of claim 2 comprising treating the atmosphere at temperatures of from about 0° to about 300° C.

4. The method of claim 2 wherein the hydrophobic protective substance is selected from the group consisting of fluoropolymers and silicone polymers.

5. The method of claim 2 wherein the protective material and the hydrophobic protective substance are contained within at least one single layer.

6. The method of claim 1 wherein the adsorptive material is selected from the group consisting of zeolites, carbon, Group IIA metal oxides and mixtures thereof.

7. The method of claim 6 wherein the adsorptive material is carbon.

8. The method claim 6 wherein the adsorptive material is a Group IIA metal oxide.

9. The method of claim 1 wherein the adsorptive material is a zeolite.

10. The method of claim 9 wherein the zeolite is selected from the group consisting of zeolite-Y, ferrierite, beta-zeolite, ZSM-5 and mixtures thereof.

11. The method of claim 1 wherein the protective material is selected from the group consisting of clays, alumina, silica, alkaline earth oxides, rare earth oxides, carbon, inert metal oxides and mixtures thereof.

12. The method of claim 11 wherein the protective material is selected from the group consisting of silica, alumina and mixtures thereof.

13. The method of claim 1 wherein the pollutants are selected from the group consisting of ozone, hydrocarbons, carbon monoxide, $NO_x$, $SO_x$ and mixtures thereof.

* * * * *